United States Patent [19]

Bernard et al.

[11] 4,131,520

[45] Dec. 26, 1978

[54] TWO-STAGE ANODIZATION OF CAPACITOR ELECTRODES

[75] Inventors: Walter J. Bernard, Williamstown; Stanley P. Szpak, Cheshire, both of Mass.

[73] Assignee: Sprague Electric Company, North Adams, Mass.

[21] Appl. No.: 850,117

[22] Filed: Nov. 10, 1977

[51] Int. Cl.² .................. C25B 11/10; C25D 11/34
[52] U.S. Cl. ........................... 204/42; 204/56 R; 204/58
[58] Field of Search ............ 204/38 A, 58, 42, 56 R

[56] References Cited

U.S. PATENT DOCUMENTS

| | | | |
|---|---|---|---|
| 2,094,048 | 9/1937 | Siegel | 175/315 |
| 3,415,722 | 12/1968 | Scheller et al. | 204/15 |
| 3,496,076 | 2/1970 | Cheseldine | 204/56 |
| 3,614,544 | 10/1971 | Mosebach et al. | 317/230 |

FOREIGN PATENT DOCUMENTS 119151  11/1974  Japan.

*Primary Examiner*—R. L. Andrews
*Attorney, Agent, or Firm*—Connolly and Hutz

[57] ABSTRACT

In a two-stage anodization process in which the outer portion of a porous valve-metal sintered body is anodized to a higher voltage than the inner portion, the second-stage anodization is carried out in an electrolyte containing a salt of a weak acid.

10 Claims, No Drawings

TWO-STAGE ANODIZATION OF CAPACITOR ELECTRODES

BACKGROUND OF THE INVENTION

This invention relates to the anodization of porous valve-metal anodes for capacitors and particularly to a method of forming a thin oxide layer on the outer surface thereof which has been anodized to a higher voltage than the rest of the anode to increase breakdown voltage adjacent the solid electrolyte layer.

It is known to anodize sintered valve metal electrodes in such a way that the oxide layer on the outer surface is formed (anodized) at a higher voltage than that on the inner surface of the sintered body. According to one method, described by Scheller et al in U.S. 3,415,722, issued Dec. 10, 1968, the sintered body is anodized at a normal voltage and impregnated with a material which is insoluble in the electrolyte, i.e., wax, stearin, anthracene, etc. The impregnant is extracted from the outer portion of the body, the anodization is continued at a higher voltage, and finally the impregnant is extracted from the inner portion of the body. The resulting structure has a higher breakdown voltage than prior art structures because of the thicker outer oxide layer. Alternately, Scheller et al propose to carry out the second anodization in a highly viscous electrolyte without impregnation, as such an electrolyte penetrates the inner surface slowly enough so that formation of the outer surface predominates.

SUMMARY OF THE INVENTION

Therefore, it is an object of this invention to provide an improved process for the two-stage formation of sintered valve metal electrodes.

It is a further object of this invention to provide an improved two-stage formation process which is applicable to both low- and high- voltage electrolytic capacitor electrodes.

It has been found that two-stage formation can be carried out without impregnation of the sintered body except for very low voltage electrodes. In the latter case, the impregnant is such that there is no removal problem.

According to the present invention, the sintered anodes are anodized in a conventional electrolyte in the first stage, e.g. in phosphoric, sulfuric, or hydrochloric acids or salts of them, during which a very uniform film is formed throughout the pellet structure. During the second-stage, a different electrolyte is used containing a salt of a weak acid as solute in the electrolyte, so that hydronium ion concentration increases in the pores as a result of charge passage therein but not at the surface as the bath conditions are typical of a well-stirred bath or reactor. Ion transport or diffusion is such that the weak acid anion moves into the pores as necessary to balance the electrical charges. As a result, the concentration of the principal conducting species (hydronium ion) is reduced in the establishment of equilibrium between the hydronium ion, acid anion, and undissociated acid, thus forming a poorer-conducting species. Hence, it is necessary to use a different electrolyte in the second-stage, i.e., a salt of a weak acid having an ionization constant of less than $1.0 \times 10^{-4}$ in contrast to the stronger (more ionic) electrolyte of the first-stage having a larger ionization constant. The reduction in the concentration of the conducting species results in a relatively high voltage drop in the electrolyte which hinders further anodization in the interior while a thicker oxide layer is being built up on the outside to a higher formation voltage in the region of continued high conductivity. Such diffusion and change in electrolyte concentration within the pores is discussed by W. J. Bernard and E. J. Fresia, "Anodic Oxidation of Porous Aluminum Pellets" *Electrocomponent Sci. Technol.* 1, 59-64 (1974).

When forming very low voltage capacitors (10.0V), it becomes necessary to hinder or block even more the anodization within the pores, as even a slight increase in oxide film thickness will strongly affect overall capacitance. Therefore, instead of relying on the conversion of conducting species within the pores to non-conducting species, the sintered anode is impregnated with distilled water, ethylene glycol, or other poorly conducting solvent, so that by the time the weak acid ion has diffused in and formed a more conducting medium than the pure solvent, the second stage anodization to produce the additional layer at the exterior is almost or totally completed. An alternative procedure is to impregnate the anode before the second stage formation with the weak acid corresponding to the salt to be used as electrolyte solute.

By either process, the anode is finished in the usual manner and made up into capacitors with a solid electrolyte, e.g., manganese dioxide.

DESCRIPTION OF THE PREFERRED EMBODIMENTS

The preferred method which is adaptable to efficient production is as follows. Sintered valve-metal pellets are anodized in a conventional formation electrolyte, such as phosphoric acid or an ammonium chloride solution, to the desired voltage.

The pellets are thoroughly rinsed to remove all traces of the electrolyte and subjected to a second anodization in a solution of a salt of a weak acid to form an outer layer at a higher voltage than that of the interior. The preferred second-stage formation electrolyte is a salt of boric acid, such as borax, or ammonium pentaborate, although salts of weak acids having a dissociation constant of $1.0 \times 10^{-4}$ or less may be used. The preferred concentration of the above preferred electrolytes is 0.01-4.0 wt.% borax or pentaborate in a solution which may contain 1-5 wt % boric acid as an acid anion reservoir to permit large numbers of pellets to be anodized at the same time as in a production situation.

The pellets are rinsed of electrolyte and treated in the usual manner, e.g., impregnated with a solid electrolyte such as manganese dioxide, and made into capacitors.

When producing low-voltage capacitors (about a 10V anodization), any increase in the oxide film thickness in the interior of the pellet during the second stage anodization is undesirable. Therefore, an additional step is added of impregnating the pellets with a poorly conducting solvent, e.g., distilled water, ethylene glycol, etc. Another means of achieving a blocking action is to use a solution of the weak acid itself as the impregnant prior to the second-stage formation. Since the weak acid is generated by the dissociation of the salt (at which point the conductivity drops) during the limited anodization within the pores, the introduction of that solution before anodization anticipates its eventual presence and facilitates the effect desired. While the electrolyte still will tend to diffuse into the pores under the influence of the applied field, if the second-stage anodization time is kept short, external anodization will be completed before any significant conduction, and hence anodization, occurs internally. A salt of a weak acid must still be used as electrolyte or else the current-blocking action of the solvent or acid, e.g., boric acid, in the pores will be overcome quickly.

EXAMPLE 1

This example shows the application of the present invention to high-voltage formation of tantalum pellets. Pellets weighing 2.7 g were anodized in 1% ammonium chloride solution at 25° C to 1000V. The resulting capacitance was 56.7 μF at 120 Hz. Second-stage anodization was carried out at 25° C to 180V in an ammonium borate solution having a resistivity of 4400 ohm-cm at 25° C. The charge required was only 1.3% of that for the first formation, and the capacitance was virtually unchanged, even though the pellet exterior was anodized to 180V, showing that there was little secondary anodization in the pellet interior.

EXAMPLE 2.

This example shows an application to low-voltage formation. Pellets weighing 0.13 g. were anodized in 1% ammonium chloride to 9V at 90° C, giving a capacitance of 75 μF at 120 Hz. A second-stage anodization at 90° C was carried out in 4% ammonium pentaborate with a specific resistivity of 100 Ω - cm at 25° C. The apparent formation voltage on the pellet exterior was 29V, but the total capacitance was only reduced by 10%, to a value of 67.6 μF.

The following examples demonstrate the utility of the present invention utilizing preimpregnation before second-stage anodization for the production of low voltage capacitors. The tantalum pellets were formed to 75V at constant current in the second-stage electrolyte without a first-stage formation, and, after capacitance was measured, the pellets were fractured to permit a visual determination of the formation voltage in the pores.

EXAMPLE 3

The second-stage anodization was carried out without solvent impregnation in 2% ammonium pentaborate for 4 min. The capacitance was 445 μF, and, on fracturing the pellet, a visible area of 30V formation was evident in the interior.

EXAMPLE 4

The pellets were pre-dipped in distilled water and then anodized in 2% ammonium pentaborate for 3.17 min. The capacitance was 530 μF, and there was no interior formation.

EXAMPLE 5

The pellets were pre-dipped in ethylene glycol and then anodized in 2% ammonium pentaborate for 4.10 min. The capacitance was 540 μF, and there was no interior formation.

EXAMPLE 6

The pellets were predipped in distilled water and anodized in 0.33% phosphoric acid for 17.5 min. The capacitance was 87 μF, and the interior, like the exterior, was formed to 75 V.

Comparison of examples 3, 4, and 5 shows the blocking action of the solvent against anodization of the interior in the second stage. Example 5 demonstrates that the use of a conventional electrolyte utilizing a relatively strong acid ($K_I = 7.5 \times 10^{31\ 3}$) results in an overall uniform oxide film formation even when the pellet has been previously impregnated with distilled water, in striking contrast to the results shown in Examples 3 and 4. This is shown by the visual observations of the oxide film color in the pellet interior upon fracturing the pellet, the low capacitance, and the long formation time.

EXAMPLE 7

Ten experimental units were made into capacitors and compared with 11 control units. For the experimental units, 2.7 g tantalum pellets were anodized in a conventional phosphoric acid electrolyte at 90° C and a formation current of 100 mA/pellet. The pellets were rinsed thoroughly and predipped in deionized water. The second stage anodization was carried out in an aqueous solution of 1% boric acid and 0.04% borax (both percentages by weight) for 120 sec., at 90° C and a formation current of 75 mA/pellet.

Table I

|  | Control | Experimental | Ratio |
|---|---|---|---|
| Formation voltage ($V_F$) | 150V | 120V | 1.25 |
| Second-stage $V_F$ | — | 155V | |
| After Aging at 125° C, 35V | | | |
| Capacitance (μF) | 29.4 | 36.8 | 1.25 |
| Dissipation Factor | 1.0 | 1.0 | |
| Median leakage current (μA) | 0.45 | 0.45 | |
| $I_L/\mu F$ | 0.015 | 0.012 | |

Since, in the production process, the anodized pellets are thoroughly rinsed with water before impregnation with the working electrolyte and assemblage into capacitors, the salt used as the second-stage electrolyte should be a salt of water-soluble weak acid.

Although tantalum is the preferred valve-metal as is shown throughout the examples, it should be understood that the process is applicable to other valve-metals such as aluminum, titanium, zirconium, hafnium, and niobium.

What is claimed is:

1. A process for forming an electrolytic capacitor electrode from a sintered valve-metal pellet including the steps of anodizing the pellet in a conventional formation electrolyte in a first-stage to a predetermined voltage and thereafter forming a thicker oxide layer on the outer surface of said pellet than in the center of said pellet by anodization in a second-stage at a higher voltage, said second-stage anodization being in an electrolyte different from that in the first-stage and containing a salt of a water-soluble weak acid having a dissociation constant of less than $1.0 \times 10^{-4}$ and then rinsing the pellet free of second-stage electrolyte with water.

2. A process according to claim 1 wherein said pellet from the first-stage is impregnated with a material selected from the group consisting of (1) a poorly conducting solvent in which the solute of the second-stage electrolyte is soluble and (2) the weak acid which arises from the salt in said second-stage before subjecting said pellet to second-stage anodization.

3. A process according to claim 2 wherein said poorly conducting solvent or acid is miscible with water when the second-stage electrolyte is in the form of an aqueous solution.

4. A process according to claim 3 wherein said solvent is selected from the group consisting of distilled water, ethylene glycol, and mixtures thereof.

5. A process according to claim 2 wherein said poorly conducting solvent or said weak acid and said second-stage electrolyte are in the form of non-aqueous solutions.

6. A process according to claim 1 wherein said conventional formation electrolyte is selected from the group consisting of phosphoric acid, sulfuric acid, hydrochloric acid, and salts thereof.

7. A process according to claim 1 wherein 1-5 wt % of a weak acid corresponding to the salt solute in the second-stage electrolyte as an acid anion reservoir is present in said second-stage electrolyte.

8. A process according to claim 7 wherein said weak acid is boric acid and said salt is ammonium pentaborate or borax.

9. A process according to claim 1 wherein said second-stage electrolyte is an aqueous solution of 0.01-4.0 wt % ammonium pentaborate.

10. A process according to claim 1 wherein said second-stage electrolyte is an aqueous solution of 0.01-4.0 wt % borax.

* * * * *

UNITED STATES PATENT OFFICE
CERTIFICATE OF CORRECTION

Patent No. 4,131,520   Dated December 26, 1978

Inventor(s) Walter J. Bernard et al

It is certified that error appears in the above-identified patent and that said Letters Patent are hereby corrected as shown below:

Column 3, line 10, "1000V" should read -- 100V --

Column 3, line 68, the equation should read

-- ($K_I = 7.5 \times 10^{-3}$) --

Column 5, line 7, claim 7 should read

-- 7. A process according to claim 1 wherein 1-5 wt % of a weak acid corresponding to the salt solute in the second stage electrolyte is present in said second-stage electrolyte as an acid anion reservoir. --

Signed and Sealed this

Twelfth Day of June 1979

[SEAL]

Attest:

RUTH C. MASON
Attesting Officer

DONALD W. BANNER
Commissioner of Patents and Trademarks